(12) United States Patent
Clark

(10) Patent No.: US 6,641,086 B2
(45) Date of Patent: Nov. 4, 2003

(54) SYSTEM AND METHOD FOR CONTROLLING AN AIRCRAFT

(75) Inventor: Walter D. Clark, Fullerton, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 0 days.

(21) Appl. No.: 09/930,339

(22) Filed: Aug. 14, 2001

(65) Prior Publication Data
US 2003/0034421 A1 Feb. 20, 2003

(51) Int. Cl.$^7$ ............................................. B64C 13/00
(52) U.S. Cl. ............................................. 244/75 R
(58) Field of Search ........................ 244/75 R, 90 R, 244/90 A, 35 R (56) References Cited

U.S. PATENT DOCUMENTS

| | | | |
|---|---|---|---|
| 993,724 A | 5/1911 | Simmons | |
| 1,334,707 A | 3/1920 | Martin | |
| 1,600,671 A | 9/1926 | Hill | |
| 1,803,498 A | 5/1931 | Chilton | |
| 1,858,259 A | 5/1932 | Alfaro | |
| 1,890,012 A | 12/1932 | Alfaro | |
| 1,947,461 A | 2/1934 | DePort | 244/29 |
| 2,173,538 A | 9/1939 | McKellar | 244/75 |
| 2,369,832 A | 2/1945 | Klose | 244/90 |
| 2,403,770 A * | 7/1946 | Van Zelm | 355/55 |
| 2,406,506 A | 8/1946 | Northrop | 244/13 |
| 2,407,401 A * | 9/1946 | Clauser et al. | 244/216 |
| 2,412,646 A | 12/1946 | Northrop et al. | 244/13 |
| 2,416,958 A | 3/1947 | Sears | 244/13 |
| 2,417,189 A * | 3/1947 | Cornelius | 244/13 |
| 2,702,172 A | 2/1955 | Focke | 244/48 |
| 2,820,601 A | 1/1958 | Crawford | 244/90 |
| 2,987,277 A * | 6/1961 | Richardson et al. | 244/204 |
| 3,761,041 A * | 9/1973 | Putman | 244/13 |
| 4,146,200 A * | 3/1979 | Borzachillo | 244/215 |
| 4,455,004 A * | 6/1984 | Whitaker, Sr. | 244/45 R |
| 4,466,586 A * | 8/1984 | Burnham | 244/113 |
| 4,729,528 A * | 3/1988 | Borzachillo | 244/214 |
| 4,796,192 A * | 1/1989 | Lewis | 244/75 R |
| 4,892,274 A * | 1/1990 | Pohl et al. | 244/213 |
| 4,998,689 A | 3/1991 | Woodcock | 244/46 |
| 5,112,009 A * | 5/1992 | Farineau | 244/181 |
| 5,156,358 A * | 10/1992 | Gerhardt | 244/199 |
| 5,375,793 A * | 12/1994 | Rivron et al. | 244/184 |
| 5,531,402 A * | 7/1996 | Dahl | 244/189 |
| 5,681,014 A | 10/1997 | Palmer | 244/219 |
| 6,079,672 A | 6/2000 | Lam et al. | 244/217 |
| 6,095,459 A * | 8/2000 | Codina | 244/213 |
| 6,098,923 A * | 8/2000 | Peters, Jr. | 244/13 |
| 6,241,183 B1 * | 6/2001 | Mathieu | 244/75 R |

FOREIGN PATENT DOCUMENTS

EP   0 899 190 A2   3/1999   ............. B64C/9/12

OTHER PUBLICATIONS

PCT International Search Report in International Application No. PCT/US 02/25731, dated Oct. 9, 2002, 8 pages.

* cited by examiner

*Primary Examiner*—Charles T. Jordan
*Assistant Examiner*—Stephen A. Holzen
(74) *Attorney, Agent, or Firm*—Baker Botts L.L.P.

(57) ABSTRACT

A system for controlling an aircraft includes an airframe, a first airfoil, and a second airfoil. At least a portion of the first airfoil and the second airfoil are controllably deflectable so that, during a roll maneuver, the first airfoil generates increased lift and a consequent increased drag, and the second airfoil generates negative lift and a consequent increased drag, the increased lift and the decreased lift generating a roll moment, and the increased drag of the second airfoil producing a yaw moment that counteracts the yaw moment produced by the increased drag of the first airfoil such that no substantial change in aircraft yaw moment occurs. The drag on the down-going wing may counteract the drag on the up-going wing by having a reduced area providing the down-going force so that it has to deflect to the point that it is producing not only less, but actually negative lift.

35 Claims, 2 Drawing Sheets

SYSTEM AND METHOD FOR CONTROLLING AN AIRCRAFT

TECHNICAL FIELD OF THE INVENTION

This invention relates generally to the field of aircraft and, more specifically, to systems and methods for controlling aircraft.

BACKGROUND OF THE INVENTION

Figure 1:
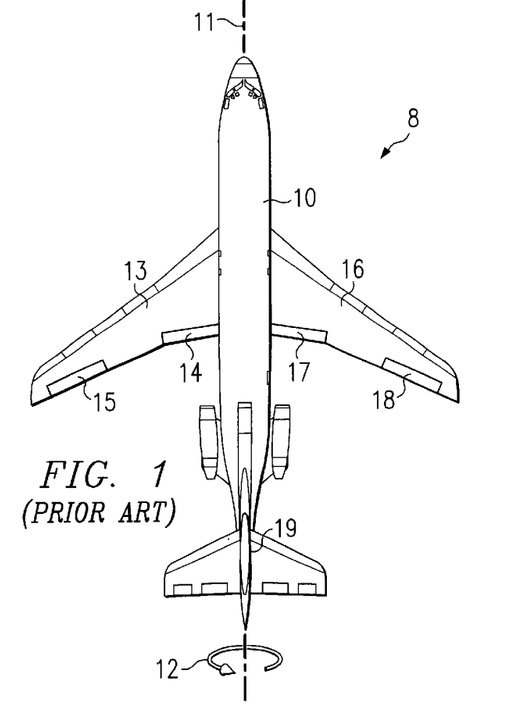
FIG. 1 illustrates an aircraft having typical control surfaces.

Aircraft generally have a variety of control surfaces that can be deflected to cause the aircraft to perform maneuvers during flight. FIG. 1 illustrates an aircraft 8 having typical control surfaces. Aircraft 8 includes an airframe 10, a first wing 13, a second wing 16, and a rudder 19. Movably coupled to first wing 13 is a flap 14 and an aileron 15, and movably coupled to second wing 16 is a flap 17 and an aileron 18. Flap 14 and flap 17 can be extended from the trailing edge of first wing 13 and second wing 16, respectively, to generate increased lift for aircraft 8, which can cause aircraft 8 to climb. Aileron 15 and aileron 18, on the other hand, are hingedly coupled to first wing 13 and second wing 16, respectively, and can be deflected relative to the trailing edge of first wing 13 and second wing 16, respectively, to generate increased or decreased lift. Because of their distance from a centerline 11 of aircraft 8, the increased or decreased lift generated by deflecting aileron 15 or aileron 18 can readily cause aircraft 8 to rotate about centerline 11, i.e., a roll maneuver. For example, deflecting aileron 15 downward generates increased lift, and deflecting aileron 18 upward generates decreased lift, which together can cause aircraft 8 to roll in the direction of arrow 12. In general, aileron 15 and aileron 18 can be deflected simultaneously, albeit in opposite directions, or individually to cause aircraft 8 to roll in either direction. Note, aileron 15 and aileron 18 can also be used in making turns, especially coordinated turns. In addition, rudder 19 can be deflected to turn aircraft 8 either left or right, i.e., a yaw maneuver. Rudder 19, however, can also be used during roll maneuvers, as discussed below.

Figure 2:
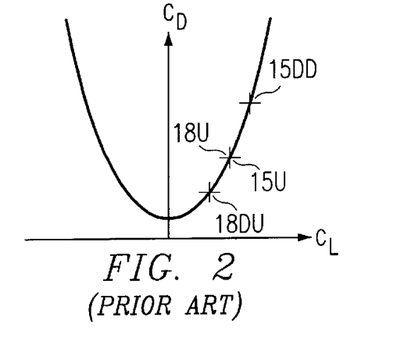
FIG. 2 is a plot illustrating the relation between the coefficient of drag and the coefficient of lift for a wing of the aircraft in FIG. 1 based on the deflection of an aileron.

FIG. 2 is a plot illustrating the relation between the coefficient of drag and the coefficient of lift for first wing 13 and second wing 16 based on the deflection of aileron 15 and aileron 18, respectively. Note, the coefficient of lift and the coefficient of drag are converted to actual lift and drag forces by multiplying the coefficients by the area of the surface and the square of the velocity. When aircraft 8 is flying level, aileron 15 and aileron 18 are typically set so that first wing 13 and second wing 16 have substantially equally coefficients of lift and drag, represented by point 15U and point 18U, respectively, allowing aircraft 8 to be balanced in roll moment and yaw moment. When aircraft 8 is to execute a roll maneuver, however, the coefficient of lift and the coefficient of drag for first wing 13 and second wing 16 change, due to the deflection of aileron 15 and aileron 18, respectively. For example, when aircraft 8 is to roll in the direction of arrow 12 in FIG. 1, aileron 15 deflects downward, causing the coefficient of lift to increase and a consequent increase in the coefficient of drag, represented by point 15DD, and aileron 18 deflects upward, causing the coefficient of lift to decrease and a consequent decrease in the coefficient of drag, represented by point 18DU. The increased lift generated by the deflection of aileron 15 and the decreased lift generated as a consequence of the deflection of aileron 18 cause aircraft 8 to roll in the direction of arrow 12. However, the increased drag generated as a consequence of the deflection of aileron 15 and the decreased drag generated as a consequence of the deflection of aileron 18 produce a moment that causes aircraft 8 to yaw in the direction of first wing 13, i.e., away from the roll, termed "adverse yaw."

Typically, an adverse yaw moment is not problem because aircraft have control surfaces, such as rudders or differential drag flaps, to compensate for the induced yaw moment. Rudder 19 of aircraft 8, for example, may be deflected to compensate for an induced yaw moment. But in aircraft that have no such control surfaces, or prefer not to use them due to radar cross section concerns, compensating for either adverse yaw moment or its opposite, i.e., proverse yaw moment, during a roll maneuver becomes more difficult.

SUMMARY OF THE INVENTION

The present invention provides a system and method that substantially reduces or eliminates at least some of the disadvantages and problems associated with previously developed aircraft control surfaces. Accordingly, in certain embodiments, the present invention provides a system and method that compensate for yaw moment during at least certain roll maneuvers of an aircraft without the use of a rudder or differential drag flaps.

In particular embodiments, a system in accordance with the present invention includes an airframe, a first airfoil, and a second airfoil. The first airfoil is coupled to a first side of the airframe, and the second airfoil is coupled to a second side of the airframe, at least a portion of the first airfoil and at least a portion of the second airfoil being controllably deflectable to facilitate roll maneuvers of the aircraft. The deflectable portion of the first airfoil is deflectable to generate increased lift and a consequent increased drag for at least a portion of the first airfoil, and the deflectable portion of the second airfoil is deflectable to generate negative lift and a consequent increased drag for at least a portion of the second airfoil during at least one roll maneuver, the increased lift of the first airfoil and the decreased lift of the second airfoil causing the aircraft to roll, and the increased drag of the second airfoil producing a yaw moment that counteracts the yaw moment produced by the increased drag of the first airfoil such that the roll maneuver does not substantially change the yaw moment of the aircraft.

In other embodiments, a method in accordance with the present invention includes deflecting at least a portion of a first airfoil to generate increased lift and a consequent increased drag for at least a portion of the airfoil to facilitate a roll maneuver and deflecting at least a portion of a second airfoil to generate negative lift and a consequent increased drag for at least a portion of the airfoil to facilitate the roll maneuver. The increased lift of the first airfoil and the decreased lift of the second airfoil generate a roll moment causing the aircraft to roll, and the increased drag of the second airfoil produces a yaw moment that counteracts the yaw moment produced by the increased drag of the first airfoil such that the roll maneuver does not substantially change the yaw moment of the aircraft.

The present invention has several technical features and advantages. For example, in particular embodiments, the invention allows an aircraft to perform a roll maneuver without substantially changing the yaw moment of the aircraft, which allows the aircraft to perform a roll maneuver without substantial adverse yaw. This ability may be particularly useful in making coordinated turns in aircraft where the design emphasis is on low radar cross section, because the use of rudders or differential drag flaps to compensate for adverse yaw increases radar cross section. As another example, in certain embodiments, the invention allows an aircraft to perform a roll maneuver without experiencing a substantial change in net lift, which prevents the aircraft from losing altitude during the maneuver. As an additional example, in some embodiments, the invention allows an aircraft to perform a roll maneuver without substantially changing the pitch moment of the aircraft, which prevents the aircraft from changing its longitudinal orientation during the maneuver. As a further example, in certain embodiments, the invention allows an aircraft to produce a yaw moment without substantially changing the roll moment. This could allow a pilot to line up the aircraft with the runway even if there is a crosswind. Furthermore, this could facilitate a more familiar feel to pilots who are accustomed to controlling yaw with rudder pedals. Moreover, in particular embodiments, the yaw maneuver may be executed without substantially changing the pitch moment or net lift of the aircraft. Note, some embodiments may possess none, one, some, or all of these technical features and advantages and/or additional technical features and advantages.

In particular embodiments, the aircraft has swept back wings. In some of these embodiments, a method and system in accordance with the present invention include the ability to deflect at least a portion of a first airfoil to generate increased lift and a consequent increased drag for at least a portion of the first airfoil and deflect at least a portion of a second airfoil to generate negative lift and a consequent increased drag for at least a portion of the second airfoil, wherein the fore-aft spacing of the lift forces is coincident during at least one roll maneuver. By aligning these forces, the aircraft is balanced in pitch during the roll maneuver and can still perform a coordinated roll, in that the increased lift generated by the first airfoil and the negative lift generated by the second airfoil produce a roll moment while the increased yaw moment produced by the increased drag of the first airfoil is countered by the increased yaw moment produced by the increased drag of the second airfoil.

Other technical features and advantages will be readily apparent to one of skill in the art from the following figures, description, and claims.

BRIEF DESCRIPTION OF THE DRAWINGS

To provide a more complete understanding of the present invention, especially when considered in light of the following written description, and to further illuminate its technical features and advantages, reference is now made to the following drawings, in which.

DETAILED DESCRIPTION OF THE INVENTION

Figure 3:
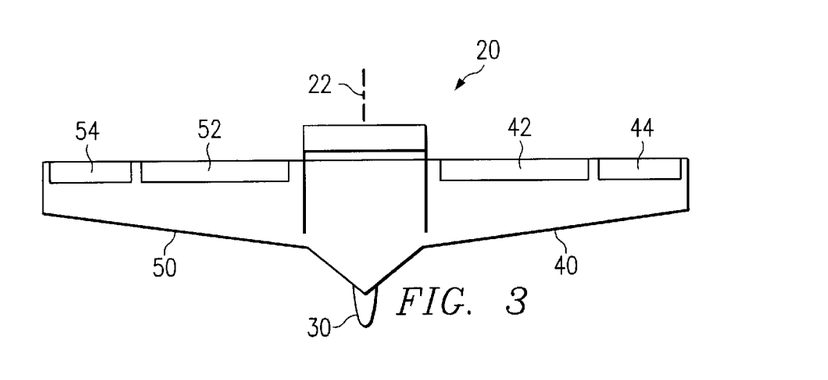
FIG. 3 illustrates a top view of one embodiment of an aircraft in accordance with the present invention.

FIG. 3 illustrates a top view of one embodiment of an aircraft 20 in accordance with the present invention. Aircraft 20 includes an airframe 30, a first airfoil 40, and a second airfoil 50. First airfoil 40, which may be a wing, a stabilizer, or any other type of airfoil that can be controlled, includes a first deflectable portion 42 and a second deflectable portion 44, which may be ailerons, flaps, conformal warping surfaces, or any other type of airfoil portion that can be controlled to generate increased and/or decreased lift and drag, movably coupled thereto. Second airfoil 50, which may be a wing, a stabilizer, or any other type of airfoil that can be controlled, includes a first deflectable portion 52 and a second deflectable portion 54, which may be ailerons, flaps, conformal warping surfaces, or any other type of airfoil portion that can be controlled to generate increased and/or decreased lift and drag, movably coupled thereto. Deflections of first deflectable portion 42 and second deflectable portion 44 and deflections of first deflectable portion 52 and second deflectable portion 54 generate increased and/or decreased lift on opposite sides of aircraft 20, which can cause aircraft 20 to rotate about a centerline 22, i.e., a roll maneuver.

As illustrated in FIG. 3, first deflectable portion 42 and second deflectable portion 44 are ailerons that are hingedly coupled to first airfoil 40. Additionally, first deflectable portion 52 and second deflectable portion 54 are ailerons that are hingedly coupled to second airfoil 50. Deflecting the ailerons in opposite directions generates increased lift on one side of aircraft 20 and decreased lift on the opposite side of aircraft 20, which can cause aircraft 20 to roll.

Aircraft 20, however, cannot tolerate large yaw moments during roll maneuvers because it has no rudder. As part of a solution to this problem, note that second deflectable portion 44 and second deflectable portion 54 are substantially smaller, on the order of fifty percent, than first deflectable portion 42 and first deflectable portion 52. In general, the outer deflectable portions, such as second deflectable portion 44 and second deflectable portion 54, should be between twenty percent to eighty percent of the size of the inner deflectable portions, such as first deflectable portion 42 and first deflectable portion 52. Accordingly, if first deflectable portion 42 is deflected training edge downward and second deflectable portion 54 is deflected trailing edge upward to roll aircraft 20 in one direction, or if first deflectable portion 52 is deflected trailing edge downward and second deflectable portion 44 is deflected trailing edge upward to roll aircraft 20 in another direction, the outer deflectable portion must be deflected a greater amount than the inner deflectable portion to generate somewhat comparable forces for the associated portion of first airfoil 40 and second airfoil 50. In fact, the upward deflections of the outer deflectable portions may be so great that the negative lift regime is entered. This fact may be used to ameliorate yaw moments produced by a roll maneuver of aircraft 20.

Figure 4:
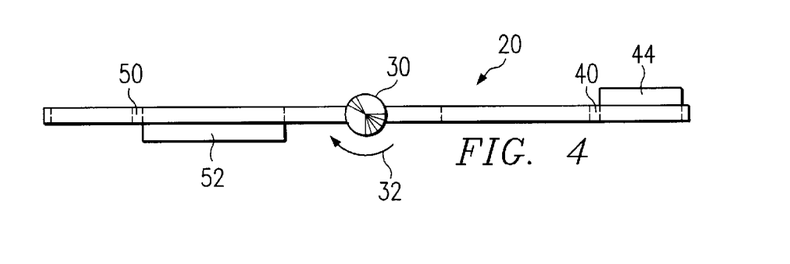
FIG. 4 illustrates a front view of the aircraft in FIG. 3 with deflections of deflectable portions that cause the aircraft to roll in a particular direction.

FIG. 4 illustrates a front view of aircraft 20 with deflections of the deflectable portions that cause aircraft 20 to roll in the direction of arrow 32. As can be seen, second deflectable portion 44 of first airfoil 40 is deflected trailing edge upward, and first deflectable portion 52 of second airfoil 50 is deflected trailing edge downward. In particular embodiments, first deflectable portion 52 can only deflect trailing edge downward, and second deflectable portion 44 can only deflect trailing edge upward. The upward deflection of second deflectable portion 44 generates decreased lift, and the downward deflection of first deflectable portion 52 generates increased lift. This decreased lift and increased lift cause aircraft 20 to roll in the direction of arrow 32. However, because second deflectable portion 44 is smaller than first deflectable portion 52, second deflectable portion 44 must deflect much more than first deflectable portion 52 to generate a somewhat comparable opposite force increment for the associated portion of first airfoil 40. This increased deflection of second deflectable portion 44 may move the associated portion of first airfoil 40 into negative lift, which provides an opportunity for a balance of yaw moment during the roll maneuver.

Figure 5:
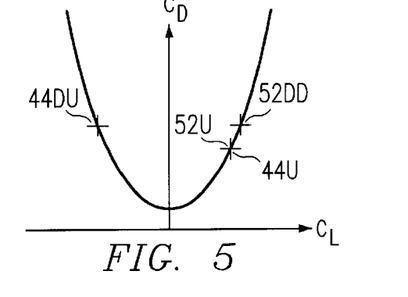
FIG. 5 is a plot illustrating the relation between the coefficient of drag and the coefficient of lift for an airfoil of an aircraft in accordance with the present invention.

FIG. 5 is a plot illustrating the relation between the coefficient of drag and the coefficient of lift for an airfoil of an aircraft in accordance with the present invention, such as first airfoil 40 and second airfoil 50 of aircraft 30. When second deflectable portion 44 and first deflectable portion 52 are undeflected, first airfoil 40 and second airfoil 50 have approximately equivalent coefficients of drag and lift, represented by point 44U and point 52U, respectively. The downward deflection of first deflectable portion 52, however, shown in FIG. 4, causes an increase in the coefficient of lift and a consequent increase in the coefficient of drag for the associated portion of second airfoil 50, represented by point 52DD. This increase in the coefficient of drag tends to make aircraft 20 yaw to the left, i.e., in the direction of second airfoil 50. In this case, however, second deflectable portion 44 has been deflected upward to the point that negative lift and a consequent increased drag are generated for the associated portion of first airfoil 40, represented by point 44DU. In a particular embodiment, second deflectable portion 44 would deflect approximately ten degrees upward to generate negative lift and consequent increased drag, and first deflectable portion would deflect approximately five degrees downward to generate increased lift and consequent increased drag. Because of the increased drag produced by the deflection of second deflectable portion 44, a yaw moment is produced that tends to make aircraft 20 yaw in the direction of first airfoil 40. Thus, by properly balancing the increased drag generated by the deflection of first deflectable portion 52 and the increased drag generated by the deflection of second deflectable portion 44, with the difference in their moment arms taken into account, a balance in yaw moment may be achieved such that no substantial change in yaw moment is generated by a roll maneuver of aircraft 20.

Note that the residual sideslip may only be near zero percent for a particular roll command at a particular coefficient of lift. Thus, in designing the aircraft, it may be preferable to choose this point to be at or near a roll rate maneuver where stealthy operation is necessary, limiting or eliminating the use of rudders or drag flaps. Any other combination of roll rate and coefficient of lift would represent a compromise. Too little roll command would result in insufficient compensation, i.e., adverse yaw, and too much roll command would result in an overmeasure of compensation, i.e., proverse yaw. While neither is desirable, both would probably be less than the adverse yaw of the aircraft without this invention.

Additionally, by properly sizing second deflectable portion 44, the decreased lift, i.e., reduced positive lift plus negative lift, generated by the upward deflection of second deflectable portion 44 may be made to balance the increased lift generated by the downward deflection of first deflectable portion 52. Thus, aircraft 20 can perform a roll maneuver without experiencing a substantial change in net lift, e.g., less than approximately two percent. Note that although the increased lift generated by the deflection of first deflectable portion 52 may be made to balance the decreased lift generated by the deflection of second deflectable portion 44, the roll moment generated by the deflection of first deflectable portion 52 will probably not equal the roll moment generated by the deflection of second deflectable portion 44 due to the longer moment arm of second deflectable portion 44. This nonsymmetrical roll moment, however, is of no consequence to the performance of aircraft 20, as long as airframe 30 is strong enough to withstand it.

During the design phase of an aircraft, the determination of how much smaller second deflectable portion 44 is than first deflectable portion 52 may be performed as described below. For a particular design speed, the lift increment for second airfoil 50 generated by the maximum deflection of first deflectable portion 52 should be determined first. Then, the deflection angle for second deflectable portion 44 should be adjusted so the portion of first airfoil 40 associated with second deflectable portion 44 produces an equal amount of decreased lift, i.e., less lift plus negative lift. Next, the increased yaw moment produced by the increased drag due to the deflection of first deflectable portion 52 should be compared to the increased yaw moment produced by the increased drag due to the deflection of second deflectable portion 44. If the increased yaw moment due to the deflection of first deflectable portion 52 is larger, second deflectable portion 44 is not sufficiently into the negative lift regime. Second deflectable portion 44 should be made smaller in area so that its deflection can be farther into the negative lift regime to produce the same amount of lift. The process would then be repeated. Note, first deflectable portion 42 and second deflectable portion 54 would be similarly sized. Other design scenarios will be readily suggested to those skilled in the art.

Airframe 30 may be composed of spars, struts, ribs, solid sections, hollow sections, bulkheads, skin, and/or any other suitable structure. Furthermore, airframe 30 may be made of steel, aluminum, titanium, composite, and/or any other suitable material. First airfoil 40 and second airfoil 50 may be composed of spars, struts, ribs, solid sections, hollow sections, skin, and/or any other suitable structure. Moreover, first airfoil 40 and second airfoil 50 may be made of steel, aluminum, titanium, composite, and/or any other suitable material. Note, in particular embodiments, airframe 30 may be a part of first airfoil 40 and second airfoil 50. Additionally, any of a variety of actuators well known to those skilled in the art may be used to actuate first deflectable portion 42, second deflectable portion 44, first deflectable portion 52, and second deflectable portion 54.

Figure 6:
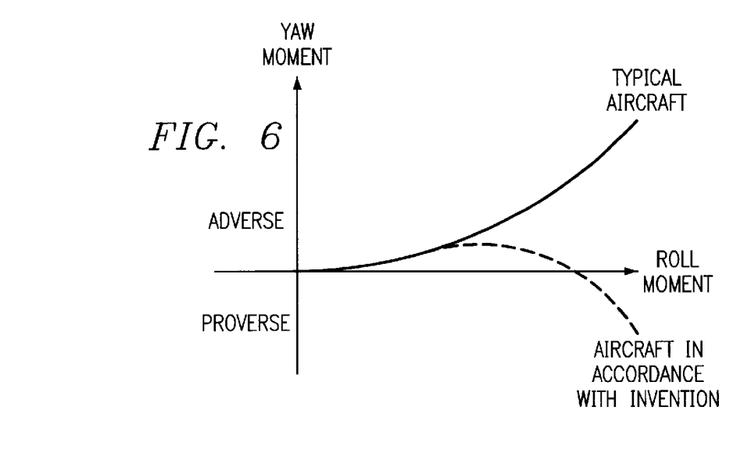
FIG. 6 is a plot illustrating the relation between yaw moment and roll moment for at least some embodiments of aircraft in accordance with the present invention and demonstrates some of the advantages of the present invention.

FIG. 6 is a plot illustrating the relation between yaw moment and roll moment for at least some embodiments of aircraft in accordance with the present invention, such as aircraft 20, and demonstrates, at least for these embodiments, some of the advantages of the present invention. The solid line in FIG. 6 illustrates the relation between yaw moment and roll moment for a typical aircraft, such as aircraft 8 illustrated in FIG. 1, and the dashed line illustrates the relation between yaw moment and roll moment for at least some embodiments of aircraft in accordance with the present invention, such as aircraft 20. As can be seen, for typical aircraft, the yaw moment is minimal when the roll moment being produced is minimal, but an adverse yaw moment increases exponentially as the roll moment increases. For aircraft 20, the yaw moment is also minimal when the roll moment being produced is minimal. Then, at moderate levels of roll moment, moderate levels of adverse yaw moment are also produced, as with typical aircraft. This adverse yaw moment occurs because the smaller deflectable portion, such as second deflectable portion 44, is either very low in the negative lift regime or still in the positive lift regime for these roll moments. Contrary to typical aircraft, however, the adverse yaw moment for aircraft 20 begins to decrease and, in fact, becomes zero as the roll moment is further increased. After becoming zero, the yaw moment becomes proverse, i.e., into the roll, as the roll moment continues to increase.

Accordingly, FIG. 6 illustrates that, for a wide range of roll moments, the yaw moment produced by at least some aircraft in accordance with the present invention is approximately equal to or less than the yaw moment produced by typical aircraft. Thus, for aircraft that can tolerate low to moderate levels of yaw moment, FIG. 6 illustrates that superior performance in yaw moment may be obtained over a wide range of roll maneuvers. In fact, the maneuvers in which yaw moment is most in balance are those with a rather high roll rate. Accordingly, the aircraft could be designed so that the higher roll rate maneuvers occur when the yaw moment at or near zero for a particular coefficient of lift. Thus, when high roll rate maneuvers are performed, the resulting yaw moment will be adverse if the roll rate is less than the designed roll rate or proverse if the roll rate is greater than the designed roll rate, but, in either case, the yaw moment will be less than the yaw moment of typical aircraft. Thus, using this design would further enhance the aircraft's handling characteristics.

In particular embodiments, the design point could be chosen for a desired roll rate when there is a need to be stealthy, meaning that aircraft's drag flaps cannot be allowed to open. As discussed above, any other combination of roll rate and coefficient of lift would be a compromise. Too little roll rate command would result in some adverse yaw moment, and too much roll rate command would result in some proverse yaw moment. Neither is desirable, but both should be better than the adverse yaw experienced by typical aircraft during roll maneuvers.

Figures 7, 9:
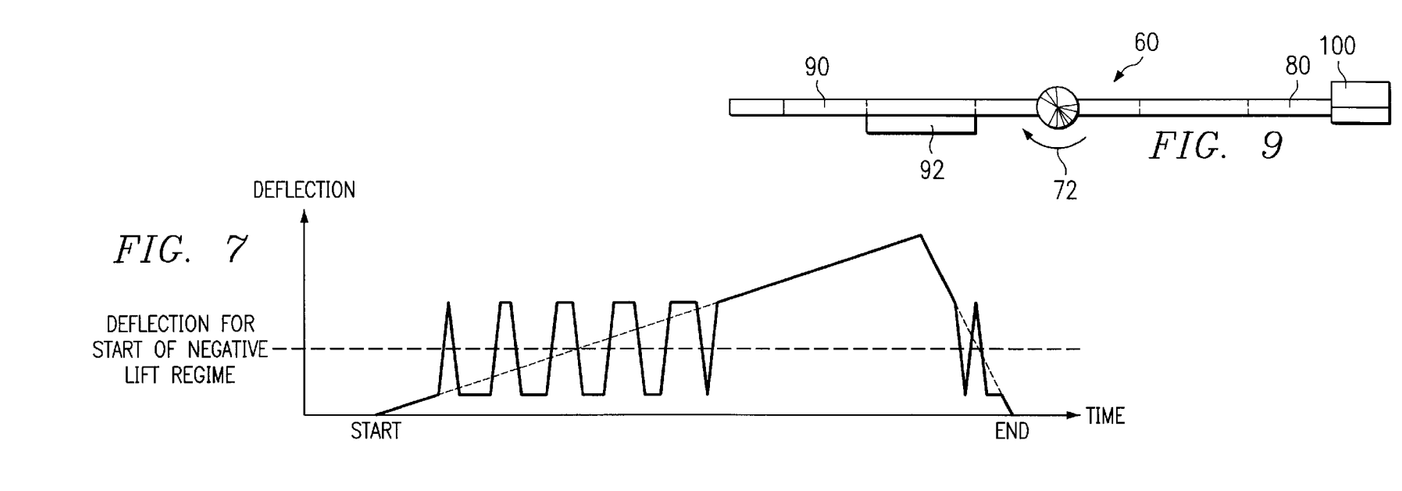
FIG. 7 is a plot illustrating the deflection of a deflectable portion of an airfoil during a roll maneuver in accordance with one embodiment of the present invention.
FIG. 9 illustrates a front view of the aircraft in FIG. 8 with deflections of deflectable portions that cause the aircraft to roll in a particular direction.

For aircraft in which very little yaw moment may be tolerated during roll maneuvers, however, other solutions may be required. One solution would be to use only the maximum roll moment at which the yaw moment is zero whenever a roll maneuver is necessary. FIG. 7 also illustrates a solution. FIG. 7 is a plot illustrating the deflection of a deflectable portion of an airfoil, such as second deflectable portion 44 of first airfoil 40, during a roll maneuver in accordance with one embodiment of the present invention. As can be seen, the deflectable airfoil has small deflections at first, but then uses a duty-cycle that deflects the airfoil into the negative lift regime and back to the cruise attitude several times a second. This jump may be over moderate angle changes, from several degrees positive to several degrees negative, for example. As more roll is commanded, the dwell time in the negative lift regime is longer and longer until the deflectable airfoil can remain there. If more roll is commanded, the deflectable airfoil can be deflected farther into the negative lift regime. FIG. 7 illustrates the result of a slow turning of the control wheel and then a sudden return to neutral once the roll angle is established. The corresponding larger deflectable portion, such as first deflectable portion 52, may deflect in a similar sequence. This "duty-cycle" process is not available to ordinary ailerons because a portion of the cycle is required for an overmeasure of compensation.

Figure 8:
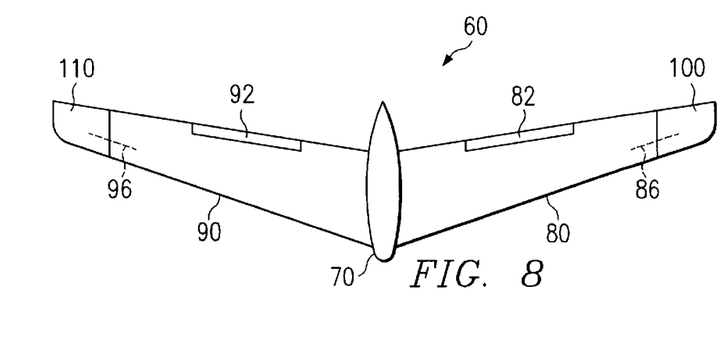
FIG. 8 illustrates a top view of a second aircraft in accordance with the present invention.

FIG. 8 illustrates a top view of another aircraft 60 in accordance with the present invention. Like aircraft 20, aircraft 60 includes an airframe 70, a first airfoil 80, and a second airfoil 90. First airfoil 80, which may be a wing, a stabilizer, or any other type of airfoil that can be controlled, includes a first deflectable portion 82, and second airfoil 90 which may be a wing, a stabilizer, or any other type of airfoil that can be controlled, includes a first deflectable portion 92. First deflectable portion 82 and first deflectable portion 92 may be ailerons, flaps, conformal warping surfaces, or any other type of airfoil portion that can be controlled to generate increased and/or decreased lift and drag. As illustrated, first deflectable portion 82 and first deflectable portion 92 are ailerons that can deflect upward or downward relative to the trailing edge of first airfoil 80 and second airfoil 90, respectively. Movably coupled so as to pivot relative to first airfoil 80 is a third airfoil 100, and movably coupled so as to pivot relative to second airfoil 90 is a fourth airfoil 110. Third airfoil 100 and fourth airfoil 110 may be movable stabilizers, movable wing tips, twist adaptive wing structures, conformal warping surfaces, or any other type of airfoil that can be controlled to generate negative lift and increased drag. As illustrated, third airfoil 100 and fourth airfoil 110 are wing sections that pivot about their spar line 86 and 96, respectively. Actuators to pivot third airfoil 100 and fourth airfoil 110 are well known to those skilled in the art. As can be seen, aircraft 60, which may be composed of similar structural elements and materials as aircraft 20 in FIG. 3, is similar to aircraft 20 except for first airfoil 80 and second airfoil 90 being swept back and second deflectable portion 44 and second deflectable portion 54 being replaced by third airfoil 100 and fourth airfoil 110, respectively.

FIG. 9 illustrates a front view of aircraft 60 with first deflectable portion 92 of second airfoil 90 deflected trailing edge downward and third airfoil 100 deflected trailing edge upward, which cases aircraft 60 to roll in the direction of arrow 72. The downward deflection of first deflectable portion 92 generates increased lift for the associated portion of second airfoil 90, and the upward deflection of third airfoil 100 generates negative lift for the associated portion of first airfoil 80. This increased lift and this decreased lift cause aircraft 60 to roll in the direction of arrow 72. However, the deflection of first deflectable portion 92 downward generates a consequent increased drag, and the deflection of third airfoil 100 upward generates a consequent increased drag. The drag increment on third airfoil 100 is created because its smaller area requires it to be far into the negative side of the lift curve. The increase in the yaw moment produced by the increased drag due to the deflection of first deflectable portion 92 and the increase in the yaw moment produced by the increased drag due to the deflection of third airfoil 100 may be made to balance each other so that at least a particular roll maneuver of aircraft 60 does not produce a substantial change in yaw moment. Note, aircraft 60 has yaw moment versus roll moment characteristics similar to aircraft 20, illustrated in FIG. 6, and, accordingly, may use any of the previously discussed techniques for controlling yaw moment during roll.

In particular embodiments, the increased lift generated by the deflection of first deflectable portion 92 may be made to equal the decreased lift, i.e., reduction in positive lift plus negative lift, generated by the deflection of third airfoil 100.

Thus, aircraft 60 may perform roll maneuvers without experiencing a substantial change in net lift.

The sweep of first airfoil 80 and second airfoil 90, however, may introduce an additional problem during roll maneuvers—the generation of a pitch moment for aircraft 60. A pitch moment may be produced during the roll maneuvers because the increased lift of second airfoil 90 is not the same distance behind the center of gravity as the decreased lift of third airfoil 100. This problem is not as significant with aircraft 20 in FIG. 3 because the deflectable portions of first airfoil 40 and second airfoil 50 are the same distance behind the center of gravity.

A solution to this problem for aircraft 60 is to align the center of pressure of third airfoil 100 with the center of first deflectable portion 92 so that they are the same distance behind the center of gravity. Thus, the increment in lift generated by the deflection of first deflectable portion 92 is horizontally aligned, at least approximately, with the decrement in lift generated by the deflection of third airfoil 100, producing equal pitch moment arms for both lift increment and the lift decrement. By having equal pitch moment arms, the lift increment and the lift decrement may be adjusted so that no substantial change in pitch moment is produced. Likewise, the center of pressure of fourth airfoil 110 may be aligned with the center of first deflectable portion 82 of first airfoil 80.

In the discussion up to this point, the deflectable portions of airfoils on the same side of the aircraft, such as first deflectable portion 92 and fourth airfoil 110, have operated independently of each other, i.e., when one portion is being actuated, the other has remained undeflected. This does not always have to be the case. For example, deflecting the inner deflectable portion downward and the outer deflectable portion upward of the same airfoil could result in a pure yaw moment. As a further example, actuating all four deflectable portions at once could serve as an airbrake.

In the design stage, the size of third airfoil 100 depends on the shape and configuration of second airfoil 90 and the flight regime of aircraft 60. In general, third airfoil 100 should be between twenty to eighty percent of the size of the portion of second airfoil 90 affected by first deflectable portion 92. In a low altitude, highly maneuverable application, all aerodynamic surfaces will likely be at a relatively low place on the coefficient of drag versus lift curve. In a high altitude and/or heavy lift application, all aerodynamic surfaces will likely be at a relatively high place on the coefficient of drag versus lift curve. For applications that are low on the coefficient of drag versus lift curve, therefore, third airfoil 100 need not deflect much more than first deflectable portion 92 to enter the negative lift regime, and, as a result, the area of third airfoil 100 would be closer to that of the portion of second airfoil 90 affected by first deflectable portion 92, possibly in the range of sixty to eighty percent. In the limit, if aircraft 60 flies with no lift, third airfoil 100 would be the same size as the portion of second airfoil 90 affected by first deflectable portion 92, and the deflection gains would be approximately the same. For applications that are high on the coefficient of drag versus lift curve, however, third airfoil 100 must be deflected far into the negative lift regime to produce a counteracting yaw moment, and, as a result, the area of third airfoil 100 would be substantially less than that of the portion of second airfoil 90 affected by first deflectable portion 92, possibly in the range of twenty to forty percent. Fourth airfoil 110 would be similarly sized.

The ability to control yaw moment during roll suggests that there should be a way to control yaw moment alone. This would be desirable, for example, when landing in a crosswind. One way to control yaw moment would be to actuate the control surfaces on the same side of the aircraft, such as first deflectable portion 82 and third airfoil 100 of aircraft 60, together, but in opposite directions. For example, deflecting first deflectable portion 82 downward generates increased lift and consequent increased drag for the associated portion of the first airfoil 80, and deflecting third airfoil 100 upward, relative to the trailing edge, generates negative lift and consequent increased drag for the associated portion of the first airfoil 80. However, because the deflected portions are on the left side of aircraft 60, the drag generated by both produces a yaw moment in the direction of first airfoil 80. By appropriate design, analogous to that discussed previously, the deflections of the deflectable portions may produce no substantial change in net lift, roll moment, and pitch moment during the yaw maneuver. The gains, however, must be different than when the control surfaces were used to roll the aircraft. This makes the control software more complicated, but certainly no additional deflectable portions are needed. Note that while non-symmetric roll moments are produced by the respective airfoils with the yaw moments held in balance during the performance of roll maneuvers in accordance with certain embodiments of the present invention, the situation is now reversed—roll moment and pitch moment must balance, and the yaw moments produced by the respective airfoils are non-symmetric. Also note that the application of drag on one or both sides of the aircraft will not put the aircraft at the brink of a tip stall because the leading edges of the tips move downward. Thus, they are below neutral; that is, the tips never produce an up increment.

Although this invention has been described with respect to flying wing aircraft without rudders or drag flaps, such as aircraft 20 and aircraft 60, this invention may have applicability to other stealth conscious aircraft, for example, to existing flying wing aircraft that do have split flaps, but would prefer not to use them, at least at certain times. Moreover, this invention may have applicability to a variety of other aircraft, such as tailed airplanes, missiles, or any other type of aircraft that need yaw control without using a vertical surface or split flaps.

Although several embodiments of the present invention have been discussed, numerous additions, deletions, substitutions, and/or alterations to the invention may be readily suggested to one of skill in the art without departing from the scope of the appended claims. It is intended therefore that the appended claims encompass such additions, deletions, substitutions, and/or alterations.

What is claimed is:

1. A system for controlling an aircraft, comprising:
   an airframe;
   a first airfoil coupled to a first side of the airframe, at least a portion of the airfoil controllably deflectable to facilitate roll maneuvers of the aircraft, the deflectable portion operable to generate increased lift and a consequent increased drag for at least a portion of the first airfoil during at least one roll maneuver;
   a second airfoil coupled to a second side of the airframe, at least a portion of the airfoil controllably deflectable to facilitate roll maneuvers of the aircraft, the deflectable portion operable to generate negative lift and a consequent increased drag for at least a portion of the second airfoil during at least one roll maneuver;
   control software executing on a computer, the control software operable to determine a deflection position of the deflectable portion of the first airfoil and of the deflectable portion of the second airfoil such that:
the increased lift of the first airfoil and the decreased lift of the second airfoil generate a roll moment causing the aircraft to roll; an
the increased drag of the second airfoil producing a yaw moment that counteracts the yaw moment produced by the increased drag of the first airfoil such that the roll maneuver does not substantially change the yaw moment of the aircraft; and
one or more actuators coupled to each deflectable portion, each actuator being operable to deflect an associated deflectable portion to the determined deflection position.

2. The system of claim 1, wherein the control software is further operable to determine the deflection posit on of the deflectable portion of the first airfoil and the deflection position of the second airfoil such that the roll maneuver does not substantially change the net lift of the aircraft.

3. The system of claim 1, wherein the control software is further operable to determine the deflection position of the deflectable portion of the first airfoil and the deflection position of the deflectable portion of the second airfoil such that the roll maneuver does not substantially change the pitch moment of the aircraft.

4. The system of claim 1, wherein:
the first airfoil comprises a first wing having a hingedly mounted aileron and a pivotably mounted airfoil outboard of the aileron; and
the second airfoil comprises a second wing having a hingedly mounted aileron and a pivotably mounted airfoil outboard of the aileron.

5. The system of claim 4, wherein the center of pressure of the pivotably mounted airfoil of the second wing and the center of the aileron of the first wing are horizontally aligned such that a roll maneuver is prevented from substantially changing the pitch moment of the aircraft.

6. The system of claim 1, wherein the control software is further operable to repeatedly determined the deflection position for the deflectable portion of the second airfoil such that the deflectable portion of the second airfoil generates negative lift and consequent increased drag when the aircraft is performing a roll maneuver having a lower roll rate, the control software directing the actuator to repeatedly deflect the deflectable portion to the determined position such that the repeated deflections generate repeated yaw moments that counteract the yaw moment generated by the deflection of the deflectable portion of the first airfoil for the roll maneuver.

7. The system of claim 1, wherein the deflectable portion of the second airfoil is approximately one-half the size of the deflectable portion of the first airfoil.

8. The system of claim 1, wherein the deflectable portion of the second airfoil is located farther outboard than the deflectable portion of the first airfoil.

9. The system of claim 1, wherein the control software is further operable to direct the actuators to simultaneously deflect the deflectable portion of the first airfoil and the deflectable portion of the second airfoil to accomplish the roll maneuver.

10. The system of claim 1, wherein:
the first airfoil includes a second deflectable portion mounted outboard of the first deflectable portion; and
the second airfoil includes a second deflectable port on mounted outboard of the first deflectable portion.

11. The system of claim 10, wherein the control software is further operable to determine the deflection positions of the first and second deflectable portions of the first airfoil such that when the deflected portions are deflected in opposite directions simultaneously, the deflections generate a yaw moment that does not substantially change the roll moment of the aircraft.

12. The system of claim 11, wherein the control software is further operable to determine the deflection positions of the first and second deflectable portions such that the deflections do not substantially change the pitch moment and net lift of the aircraft.

13. The system of claim 10, wherein the control software is further operable to determine the deflection positions of the first and second deflectable portions of the first airfoil and the first and second deflectable portions of the second such that the deflections increase the drag of the aircraft without a substantial change in yaw moment, roll moment, pitch moment, and net lift.

14. The system of claim 13, wherein the control software is further operable to determine the deflection positions of the deflectable portions of the first and second airfoils such that when the first deflectable portion of the first airfoil and the second deflectable portion of the second airfoil are deflected in one direction and the first deflectable portion of the second airfoil and the second deflectable portion of the first airfoil are deflected in another direction, simultaneously, the drag of the aircraft increases without a substantial change in yaw moment, roll moment, pitch moment, and net lift.

15. A method for controlling an aircraft, comprising:
determining deflection positions of deflectable portions of a first and a second airfoil such that:
at least one deflectable portion of the first air oil generates increased lift and a consequent increased drag for at least a portion of the first airfoil to facilitate a roll maneuver;
at least one deflectable portion of the second airfoil generates negative lift and a consequent increased drag for at least a portion of the second airfoil to facilitate the roll maneuver;
the increased lift of the first airfoil and the decreased lift of the second airfoil produce a roll moment;
the increased drag of the first airfoil produce a yaw moment that counteracts a yaw moment produced by the increased drag of the second airfoil such that the roll maneuver does not substantially change the yaw moment of the aircraft; and
deflecting the deflectable portions of the first and second airfoils to the determined deflection positions.

16. The method of claim 15, further comprising determining the deflection positions of the first and second airfoils such that the roll maneuver does not substantially change the net lift of the aircraft.

17. The method of claim 15, further comprising determining the deflection positions of the deflectable portions of the first and second airfoils such that the roll maneuver does not substantially change the pitch moment of the aircraft.

18. The method of claim 15, wherein:
the first airfoil comprises a first wing having a hingedly mounted aileron and a pivotably mounted airfoil outboard of the aileron; and
the second airfoil comprises a second wing having a hingedly mounted aileron and a pivotably mounted airfoil outboard of the aileron.

19. The method of claim 18, further comprising horizontally aligning the center of pressure of the pivotably mounted airfoil of the second wing with the center of the aileron of the first wing to prevent the roll maneuver from substantially changing the pitch moment of the aircraft.

20. The method of claim 15, further comprising repeatedly determining the deflection position of and repeatedly deflecting the deflectable portion of the second airfoil so that it generates negative lift and consequent increased drag when the aircraft is performing a roll maneuver having a lower roll rate, the repeated deflections generating repeated yaw moments that counteract the yaw moment generated by the deflection of the deflectable portion for the first airfoil for the roll maneuver.

21. The method of claim 15, wherein the deflectable portion of the second airfoil is approximately one-half the size of the deflectable portion of the first airfoil.

22. The method of claim 15, wherein the deflectable portion of the second airfoil is located farther outboard than the deflectable portion of the first airfoil.

23. The method of claim 15, further comprising simultaneously deflecting the deflectable portion of the first airfoil and the deflectable portion of the second airfoil to accomplish the roll maneuver.

24. The method of claim 15, further comprising determining the deflection positions of and deflecting the firs deflectable portion of the first airfoil and a second deflectable portion of the first airfoil in opposite directions at the same time to generate a yaw moment that does not substantially change the roll moment of the aircraft.

25. The method of claim 24, further comprising deflecting the first and second deflectable portions such that here is no substantial change the pitch moment and net lift of the aircraft.

26. The method of claim 15, further comprising determining the deflection positions of the deflectable portion of the first airfoil and a second deflectable portion of the first airfoil and determining the deflection positions of the deflectable portion of the second airfoil and a second deflectable portion of the second airfoil, such that the drag of the aircraft is increased without a substantial change in yaw moment, roll moment, pitch moment, and net lift.

27. A system for co trolling an aircraft, comprising:
an airframe including a first wing and a second wing;
a first aileron hingedly coupled to the first wing, the first aileron deflectable to generate increased lift and a consequent increased drag for a least a portion of the first wing to facilitate roll maneuvers of the aircraft;
a first airfoil pivotably coupled to the first wing outboard of the first aileron, the first airfoil deflectable to generate negative lift and a consequent increased drag for the first airfoil to facilitate roll maneuvers of the aircraft;
a second aileron hingedly coupled to the second wing, the second aileron deflectable to generate increased lift and a consequent increased drag for at least a portion of the second wing to facilitate roll maneuvers of the aircraft;
a second airfoil pivotably coupled to the second wing outboard of the second aileron, the second airfoil deflectable to generate negative lift and a consequent increased drag for the second airfoil to facilitate roll maneuvers of the aircraft;
wherein the first aileron and second airfoil operable to cause the aircraft to roll in a first direction;
wherein the second aileron and first airfoil operable to cause the aircraft to roll in a second direction;
control software executing on a computer, the control software operable to determine deflection positions of the first airfoil, first aileron, second airfoil, and second aileron such that the yaw moments produced by the increased drag of the first and second airfoils counteracts the yaw moments produced by the increased drag of the first and second wings, respectively, such that the roll maneuvers do not substantially change the yaw moment of the aircraft; and
one or more actuators coupled to each of the first aileron, first airfoil, second aileron, and second airfoil, an actuator being operable to deflect the first aileron, first airfoil, second aileron, or second airfoil to the determined deflection position.

28. The system of claim 27, wherein the control software is further operable to determine the deflection position of the first aileron and the second airfoil such that the roll maneuver does not substantially change the net lift of the aircraft.

29. The system of claim 27, wherein the control software is further operable to determine the deflection positions of the first aileron, first airfoil, second aileron, and second airfoil such that the roll maneuvers do not substantially change the pitch moment of the aircraft.

30. The system of claim 29, wherein the center of pressure of the second airfoil and the center of the first aileron are approximately horizontally aligned and the center of pressure of the first airfoil and the center of the second aileron are approximately horizontally aligned such that roll maneuvers are prevented from substantially changing the pitch moment of the aircraft.

31. The system of claim 27, wherein the control software is further operable to repeatedly determine the deflection position of the first airfoil such that the first airfoil generates negative lift and consequent increased drag when the aircraft is performing a roll maneuver in the second direction having a lower roll rate, the control software directing the actuator to repeatedly deflect the first airfoil to the determined position such that the repeated deflections generate repeated yaw moments that counteract the yaw moment generated by the deflection of the second aileron for the second wing for the roll maneuver.

32. The system of claim 27, wherein the first airfoil is approximately one-half the size of the second wing.

33. The system of claim 27, wherein the control software is further operable to determine the deflection positions of the first aileron and the first airfoil, such that when the first aileron and the first airfoil are simultaneously deflected in opposite directions, the deflections generate a yaw moment that does not substantially change the roll moment of the aircraft.

34. The system of claim 33, wherein the control software is further operable to determine the deflection positions of the first aileron and the first airfoil such that the deflections do not generate a substantial change in pitch moment or net lift.

35. The system of claim 27, wherein the control software is further operable to determine the deflection positions of the first aileron, the second aileron, the first airfoil, and the second airfoil such at the deflections increase the drag of the aircraft without substantially changing the roll moment, yaw moment, pitch moment, and net lift.

* * * * *

UNITED STATES PATENT AND TRADEMARK OFFICE
CERTIFICATE OF CORRECTION

PATENT NO.   : 6,641,086 B2
DATED        : November 4, 2003
INVENTOR(S)  : Walter D. Clark

It is certified that error appears in the above-identified patent and that said Letters Patent is hereby corrected as shown below:

<u>Column 11,</u>
Line 5, change "an" to -- and --.
Line 16, change "posit on" to -- position --.

<u>Column 12,</u>
Line 32, change "air oil" to -- airfoil --.
Line 42, change "produce" to -- produces --.

Signed and Sealed this

Fifteenth Day of June, 2004

JON W. DUDAS
*Acting Director of the United States Patent and Trademark Office*